(12) United States Patent
Osumi (10) Patent No.: US 8,243,838 B2
(45) Date of Patent: Aug. 14, 2012

(54) TEST APPARATUS AND PROGRAM

(75) Inventor: Taro Osumi, Gunma (JP)

(73) Assignee: Advantest Corporation, Tokyo (JP)

( * ) Notice: Subject to any disclaimer, the term of this patent is extended or adjusted under 35 U.S.C. 154(b) by 209 days.

(21) Appl. No.: 12/700,701

(22) Filed: Feb. 4, 2010

(65) Prior Publication Data

US 2010/0215089 A1    Aug. 26, 2010

Related U.S. Application Data (63) Continuation of application No. PCT/JP2008/062000, filed on Jul. 2, 2008.

(30) Foreign Application Priority Data

Aug. 8, 2007 (JP) .................................. 2007-207066

(51) Int. Cl.
*H04K 1/10* (2006.01)

(52) U.S. Cl. ........ 375/260; 341/180; 359/618; 370/204; 455/136; 455/522

(58) Field of Classification Search .................. None
See application file for complete search history.

(56) References Cited

U.S. PATENT DOCUMENTS

| | | | |
|---|---|---|---|
| 2002/0008506 A1 | 1/2002 | Nakada et al. | |
| 2005/0094746 A1 | 5/2005 | Akita | |
| 2006/0025090 A1* | 2/2006 | Shirakata et al. | 455/136 |
| 2006/0193395 A1* | 8/2006 | Ferraiolo et al. | 375/265 |
| 2007/0213087 A1* | 9/2007 | Laroia et al. | 455/522 |
| 2007/0258357 A1* | 11/2007 | Akita | 370/208 |
| 2008/0019433 A1 | 1/2008 | Yamanouchi et al. | |
| 2010/0239045 A1 | 9/2010 | Kataoka | |

FOREIGN PATENT DOCUMENTS

| | | |
|---|---|---|
| JP | 2000-206160 A | 7/2000 |
| JP | 2005-136740 A | 5/2005 |
| JP | 2005-217963 A | 8/2005 |
| WO | 2006/001184 A1 | 1/2006 |
| WO | 2007/072653 A1 | 6/2007 |
| WO | 2007/077686 A1 | 7/2007 |
| WO | 2007/125581 A1 | 11/2007 |

OTHER PUBLICATIONS

International Search Report (ISR) issued in PCT/JP2008/062000 (parent application) for Examiner consideration.
Written Opinion (PCT/ISA/237) issued in PCT/JP2008/062000 (parent application).
Japanese Office Action dated May 8, 2012, in a counterpart Japanese patent application No. 2009-526369.

* cited by examiner

*Primary Examiner* — David C. Payne
*Assistant Examiner* — Adolf Dsouza
(74) *Attorney, Agent, or Firm* — Chen Yoshimura LLP (57) ABSTRACT

Provided is a measurement apparatus that measures power of an orthogonal frequency division multiplexing modulated signal (OFDM modulated signal) output from a transmitting device, comprising an output control section that causes the transmitting device to output the OFDM modulated signal having a prescribed waveform that repeats in each of a plurality of repetition periods; and a power measuring section that measures, over a measurement period that corresponds to an integer multiple of the repetition period, the power of the OFDM modulated signal output by the transmitting device. The output control section may cause the transmitting device to output the OFDM modulated signal having, as the repetition period, a period for which the arrangement of a pilot signal is the same in a direction of sub-carriers and a direction of OFDM symbols.

22 Claims, 7 Drawing Sheets

TEST APPARATUS AND PROGRAM

CROSS REFERENCE TO RELATED APPLICATION

This is a continuation application of PCT/JP2008/062000 filed on Jul. 2, 2008 which claims priority from a Japanese Patent Application No. 2007-207066 filed on Aug. 8, 2007, the contents of which are incorporated herein by reference.

BACKGROUND

1. Technical Field

The present invention relates to a measurement apparatus and a program. In particular, the present invention relates to a measurement apparatus and a program for measuring power of an orthogonal frequency division multiplexing modulated signal (OFDM modulated signal) output from a transmitting device.

2. Related Art

Orthogonal frequency division multiplexing (OFDM) is used, for example, for wireless LAN (IEEE 802.16e) according to the communication standard. An OFDM communication apparatus that adopts OFDM modulation transmits and receives orthogonal frequency division multiplexing modulated signals (referred to hereinafter as "OFDM modulated signals"). During transmission, the OFDM communication apparatus generates OFDM modulated signals by performing an IFFT (Inverse Fast Fourier Transform) on the data to be transmitted. During reception, the OFDM communication apparatus performs an FFT (Fast Fourier Transform) on the received OFDM modulated signal and extracts the data modulated by each sub-carrier.

Patent Document 1: Japanese Patent Application Publication No. 2000-206160

An apparatus is known that measures power of a transmission signal from a communication apparatus, as shown in Patent Document 1, for example. When measuring the transmission power of the OFDM communication apparatus to measure a characteristic of the OFDM communication apparatus, however, it is necessary to sample the OFDM modulated signal over a long time and calculate the average power.

SUMMARY

Therefore, it is an object of an aspect of the innovations herein to provide a measurement apparatus and a program, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary measurement apparatus may include a measurement apparatus that measures power of an orthogonal frequency division multiplexing modulated signal (OFDM modulated signal) output from a transmitting device, comprising an output control section that causes the transmitting device to output the OFDM modulated signal having a prescribed waveform that repeats in each of a plurality of repetition periods; and a power measuring section that measures, over a measurement period that corresponds to an integer multiple of the repetition period, the power of the OFDM modulated signal output by the transmitting device.

According to a second aspect related to the innovations herein, one exemplary program may include a program that causes an information processing apparatus to function as a measurement apparatus that measures power of an orthogonal frequency division multiplexing modulated signal (OFDM modulated signal) output from a transmitting device, the program causing the information processing apparatus to function as an output control section that causes the transmitting device to output the OFDM modulated signal having a prescribed waveform that repeats in each of a plurality of repetition periods; and a power measuring section that measures, over a measurement period that corresponds to an integer multiple of the repetition period, the power of the OFDM modulated signal output by the transmitting device.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
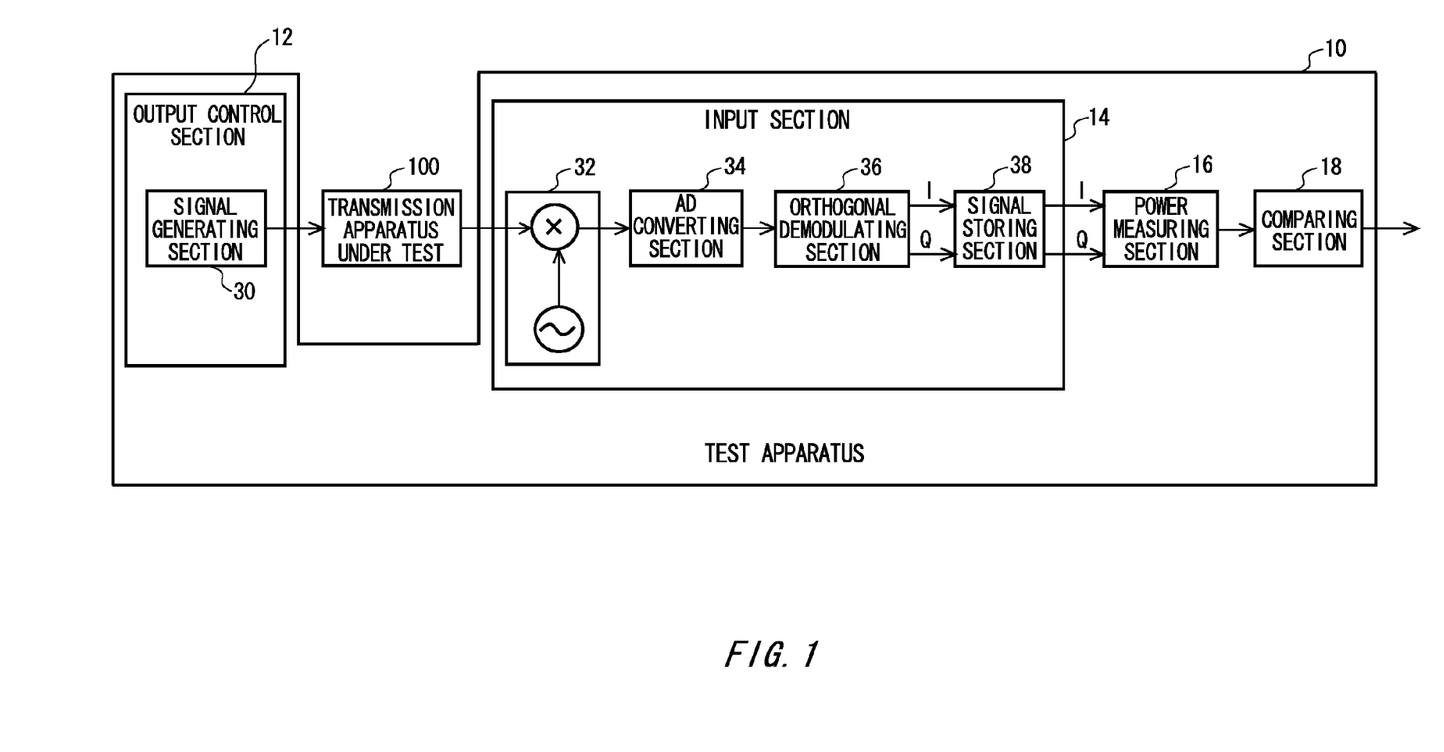
FIG. 1 shows a configuration of a test apparatus 10 according to an embodiment of the present invention, along with a transmission apparatus under test 100.

FIG. 1 shows a configuration of a test apparatus 10 according to an embodiment of the present invention, along with a transmission apparatus under test 100. The transmission apparatus under test 100 is an example of a transmitting device according to the present invention. The transmission apparatus under test 100 uses OFDM modulation, and outputs a transmission signal obtained by orthogonally modulating an OFDM modulated signal with a carrier signal having a prescribed frequency.

The test apparatus 10 is an example of a measurement apparatus according to the present invention. The test apparatus 10 measures the power of the OFDM modulated signal output from the transmission apparatus under test 100 and judges the acceptability of the transmission apparatus under test 100 based on the measurement result.

The test apparatus 10 is provided with an output control section 12, an input section 14, a power measuring section 16, and a comparing section 18. The output control section 12 outputs, from the transmission apparatus under test 100, a transmission signal obtained by modulating, with a carrier signal, an OFDM modulated signal having a prescribed waveform that repeats in each of a plurality of repetition periods. The OFDM modulated signal may be a signal as set forth in IEEE 802.16e, for example. The output control section 12 may include a signal generating section 30. The signal generating section 30 may supply the transmission apparatus under test 100 with transmission data, and the transmission apparatus under test 100 may output a transmission signal obtained by modulating the transmission data.

The input section 14 receives the OFDM modulated signal output from the transmission apparatus under test 100 having a measurement period corresponding to an integer multiple of the repetition period. The input section 14 may include a down-converter 32, an AD converting section 34, an orthogonal demodulating section 36, and a signal storing section 38. The down-converter 32 may down-convert the carrier frequency of the transmission signal output from the transmission apparatus under test 100. The down-converter 32 outputs an IF signal obtained as a result of the down-conversion on the transmission signal.

The AD converting section 34 samples the IF signal output from the down-converter 32 and digitizes the sampling result. The AD converting section 34 may instead sample and digitize the transmission signal output directly from the transmission apparatus under test 100 without passing through the down-converter 32. The orthogonal demodulating section 36 orthogonally demodulates the IF signal digitized by the AD converting section 34 and outputs a baseband signal, i.e. an I-signal and a Q-signal.

The signal storing section 38 sequentially stores the baseband signal output from the orthogonal demodulating section 36. The signal storing section 38 may sequentially store each sample of the baseband signal output from the orthogonal demodulating section 36 at sequential addresses. Here, the signal storing section 38 stores samples of the baseband signal for each measurement period. For example, the orthogonal demodulating section 36 may store a baseband signal having the number of samples contained in a single measurement period, which is an integer multiple of the repetition period.

The power measuring section 16 measures the power over the measurement period of the OFDM modulated signal output by the transmission apparatus under test 100. For example, the power measuring section 16 may calculate the power of the baseband signal having a number of samples contained in the measurement period stored in the signal storing section 38. More specifically, the power measuring section 16 calculates, for each sample n, a value $(I_n^2+Q_n^2)$ obtained as the sum of the square of the real component $(I_n)$ and the square of the imaginary component $(Q_n)$, and may calculate the power to be the summation $(\Sigma(I_n^2+Q_n^2))$ of this calculated value at each sample within the measurement period. Furthermore, the power measuring section 16 may calculate, as the power, an average value $(\Sigma(I_n^2+Q_n^2)/N)$ by dividing the summation value $(\Sigma(I_n^2+Q_n^2))$ by the number of samples N in the measurement period.

The comparing section 18 judges the acceptability of the transmission apparatus under test 100 by comparing (i) an expected value for the power of the OFDM modulated signal to be output from the transmission apparatus under test 100 and (ii) the power measured by the power measuring section 16. The test apparatus 10 described above can measure the power of the OFDM modulated signal output from the transmission apparatus under test 100 in a short time. Therefore, the test apparatus 10 can quickly test the transmission apparatus under test 100.

Figure 2:
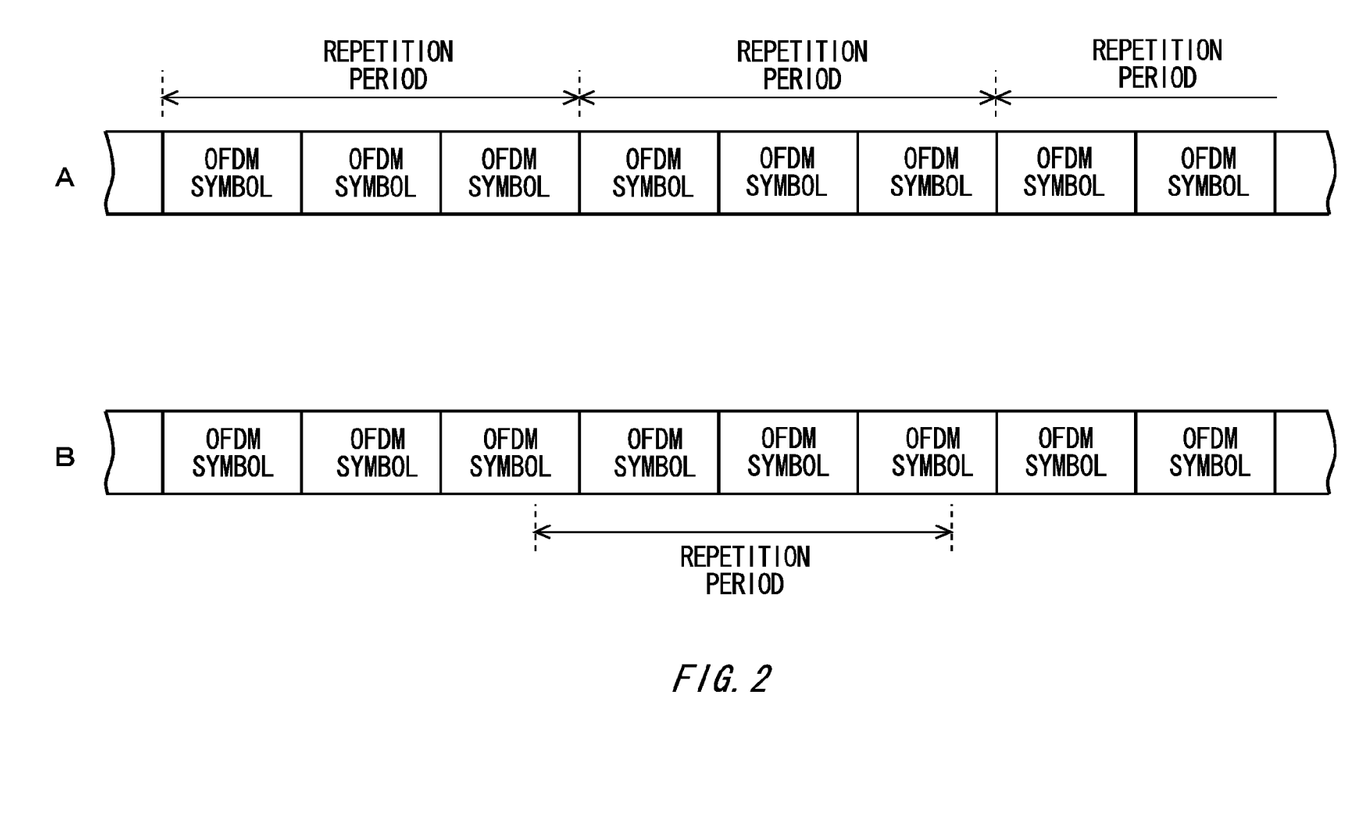
FIG. 2 shows an example of the repetition period of the OFDM modulated signal output from the transmission apparatus under test 100 and the measurement period of the power used by the power measuring section 16.

FIG. 2 shows examples of the repetition period of the OFDM modulated signal output from the transmission apparatus under test 100 and the measurement period of the power used by the power measuring section 16. The output control section 12 causes the transmission apparatus under test 100 to output the OFDM modulated signal in which the same waveform repeats in each repetition period, which is an integer multiple of the OFDM symbol. As shown by "A" of FIG. 2, for example, the output control section 12 may cause the transmission apparatus under test 100 to output an OFDM modulated signal in which the same waveform repeats for each set of three OFDM symbols.

The multipath effect can be ignored when measuring the power, and so the output control section 12 may cause the transmission apparatus under test 100 to output an OFDM modulated signal that does not include a guard interval. In this way, the test apparatus 10 can measure the power in a short time.

The power measuring section 16 measures the power over a measurement period, which is an integer multiple of the repetition period, in the OFDM modulated signal output from the transmission apparatus under test 100. As shown by "B" of FIG. 2, the power measuring section 16 may measure the power over a measurement period that is an integer multiple of the repetition period, which in this case is three OFDM symbols.

Here, the OFDM modulated signal output from the transmission apparatus under test 100 has the same waveform for each repetition period, and so the power of the extracted signal is the same no matter where in the OFDM modulated signal the signal having the length of the measurement period is extracted from. Accordingly, the power measuring section 16 may extract the signal having the length of the measurement period from any position, and may measure the power of this extracted signal. In other words, the power measuring section 16 can extract an OFDM modulated signal with a length of the measurement period from a position that is not bound by the boundaries of the OFDM symbols, and can measure the power of the extracted signal.

Therefore, the power measuring section 16 can measure the power of the OFDM modulated signal without performing a symbol synchronization process for the OFDM modulated signal. Accordingly, the test apparatus 10 can have a simple configuration that can measure the power of the OFDM modulated signal output from the transmission apparatus under test 100.

Figure 3:
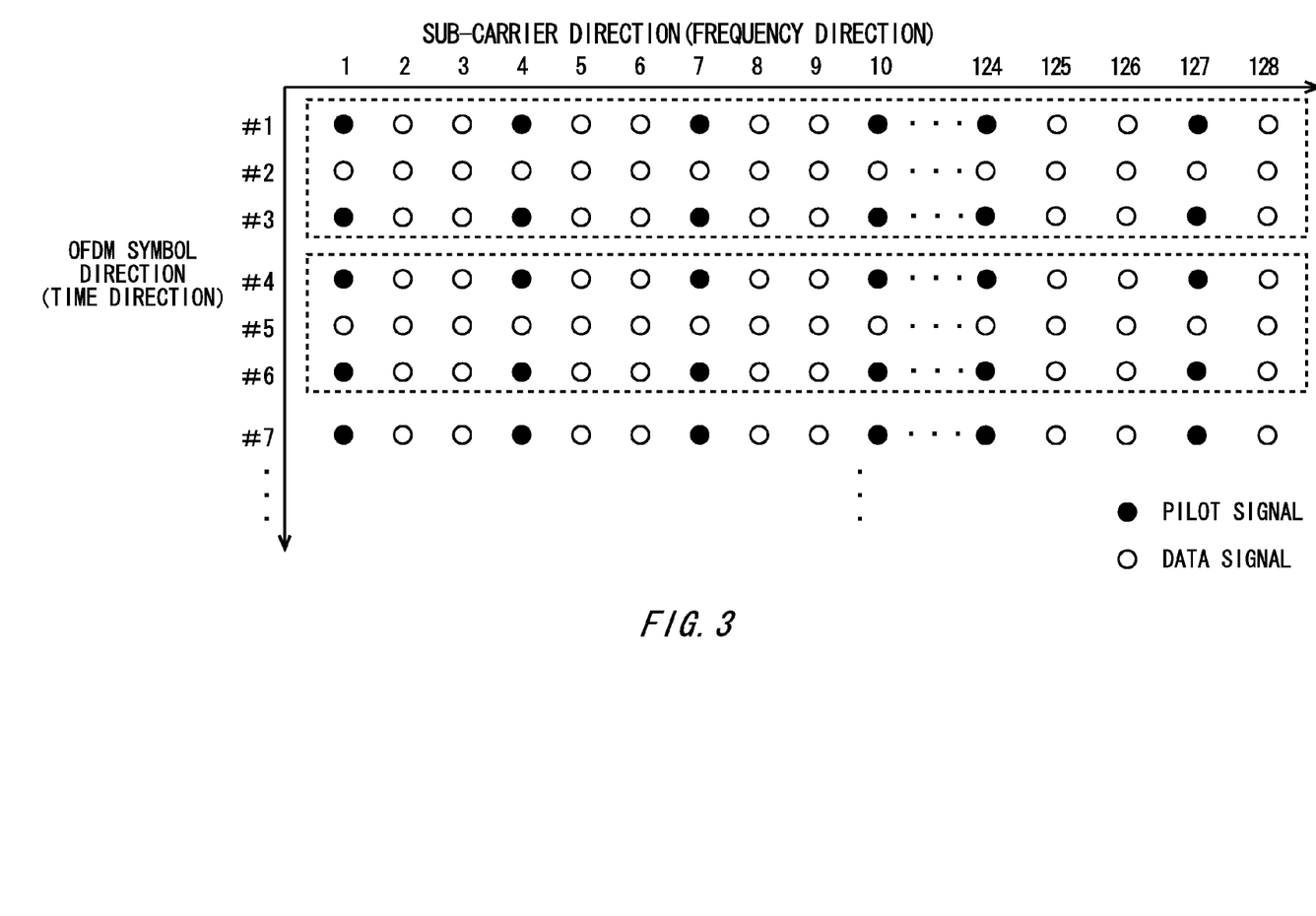
FIG. 3 shows exemplary arrangements of a data signal and a pilot signal of the OFDM modulated signal output from the transmission apparatus under test 100 by the output control section 12 according to the present embodiment.

FIG. 3 shows exemplary arrangements of a data signal and a pilot signal of the OFDM modulated signal output from the transmission apparatus under test 100 by the output control section 12 according to the present embodiment. The output control section 12 causes the transmission apparatus under test 100 to output an OFDM modulated signal obtained by performing an IFFT on a signal sequence wherein a period is repeated in which the signal component arrangement is the same in the sub-carrier direction and in the OFDM symbol direction.

The sub-carriers of the OFDM modulated signal include a pilot signal and a data signal as signal components. The pilot signal has a predetermined amplitude and phase according to the technical specifications or the like. The pilot signal is modulated with a predetermined sub-carrier of a predetermined OFDM symbol. In the example of FIG. 3, the pilot signal is output at sub-carriers numbered 1, 4, 7, 10, etc in each odd-numbered OFDM symbol.

The data signal is a signal component other than the pilot signal, and may have an amplitude and phase corresponding to a sign designated by a user. The data signal may be obtained by orthogonal phase modulation such as BPSK and QPSK or by orthogonal amplitude modulation such as 16 QAM or 64 QAM.

Here, the output control section 12 causes the transmission apparatus under test 100 to output an OFDM modulated signal in which the repetition period is set such that the arrangement of the pilot signal is the same in the sub-carrier direction and in the OFDM symbol direction. If the repetition period is set to be three consecutive OFDM symbols, as in the example of FIG. 3, the arrangement of the pilot signal is the same within each repetition period. Accordingly, in the example of FIG. 3, the output control section 12 may cause the transmission apparatus under test 100 to output an OFDM modulated signal in which three OFDM symbols are set as one repetition period. The output control section 12 causes the transmission apparatus under test 100 to output an OFDM modulated signal in which the arrangement of the sign of each data signal is the same for each period in which the arrangement of the pilot signal is the same, i.e. each period of three OFDM symbols in the example of FIG. 3.

The arrangement of the pilot signal is determined by the technical specifications and cannot be changed by the user. However, even if a pilot signal that is unchangeable by the user is included, the output control section 12 described above can cause the transmission apparatus under test 100 to output an OFDM modulated signal in which the prescribed waveform repeats for each repetition period.

Figure 4:
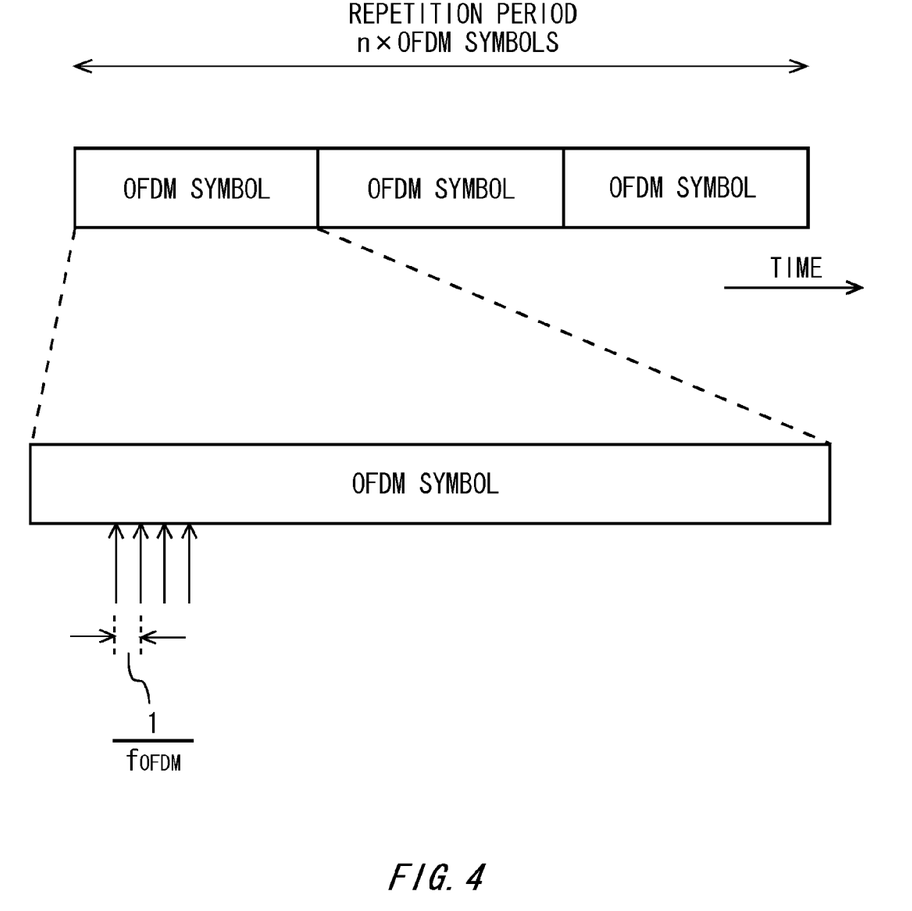
FIG. 4 shows examples of OFDM symbols and a sampling frequency of the OFDM symbols.

FIG. 4 shows examples of OFDM symbols and a sampling frequency of the OFDM symbols. If $f_{OFDM}$, e.g. 11.2 MHz, represents the sampling frequency of the OFDM symbols and M, e.g. 1024, represents the number of FFT points of the OFDM modulated signal, in order to sample an OFDM modulated signal with a length of n, e.g. 3, OFDM symbols, the AD converting section 34 must sample the OFDM modulated signal within a period T expressed below in Expression 1.

$$T=(1/(f_{OFDM}))\times M\times n \text{(seconds)} \qquad \text{Expression 1:}$$

Furthermore, if $f_C$ represents the sampling frequency of the AD converting section 34 and m represents the number of samples taken by the AD converting section 34 for sampling a period that is n OFDM symbols long, Expression 2 can be formed.

$$(1/(f_{OFDM}))\times M\times n = (1/f_C)\times m \qquad \text{Expression 2:}$$

Expression 2 can be transformed into Expression 3 shown below.

$$f_C=(f_{OFDM}/M)\times(m/n) \qquad \text{Expression 3:}$$

Here, by substituting m/n=L, Expression 3 can be transformed into Expression 4 shown below.

$$f_C=(f_{OFDM}/M)\times L \qquad \text{Expression 4:}$$

The AD converting section 34 may set the sampling frequency $f_C$ to be a value obtained by multiplying (i) an arbitrary number L and (ii) a value obtained by dividing the sampling frequency $f_{OFDM}$ of the OFDM symbols by the number M of FFT points. The signal storing section 38 then stores the OFDM modulated signal sampled with this sampling frequency $f_C$ as a number of samples (n×L=m) obtained by multiplying the number n of OFDM symbols to be sampled by the arbitrary number L. In this way, the input section 14 can begin sampling from any point and can accurately sample an OFDM modulated signal having the length of the measurement period.

Furthermore, the AD converting section 34 may sample the OFDM modulated signal using a sampling clock $f_C$ that is synchronized with the sampling frequency $f_{OFDM}$ of the OFDM modulated signal output from the transmission apparatus under test 100. As a result, the input section 14 can more accurately sample a measurement period of the OFDM modulated signal output from the transmission apparatus under test 100.

The sampling frequency $f_{OFDM}$ of the OFDM symbols and the number M of FFT points is determined in advance according to the technical specifications of the OFDM modulated signal output by the transmission apparatus under test 100 being measured. Furthermore, n corresponds to the number of OFDM symbols in a repetition period. In other words, n is predetermined according to the arrangement of the pilot signal in the direction of the sub-carriers and the direction of the OFDM symbols, which is predetermined by the technical specifications. Accordingly, the adjustable parameters in Expression 3 are $f_C$ and m. Furthermore, the range of the sampling frequency $f_C$ for the AD converting section 34 is desirably within a certain range from the limit of the oscillator, for example.

Therefore, the input section 14 adjusts the parameter m such that the sampling frequency $f_C$ is within the desirable range. The signal storing section 38 may store the OFDM modulated signal having a number of samples corresponding to the adjusted value of m. As a result, even if the sampling frequency $f_C$ of the AD converting section 34 is within a prescribed range, the input section 14 can accurately sample the OFDM modulated signal having a length of the measurement period.

Figure 5:
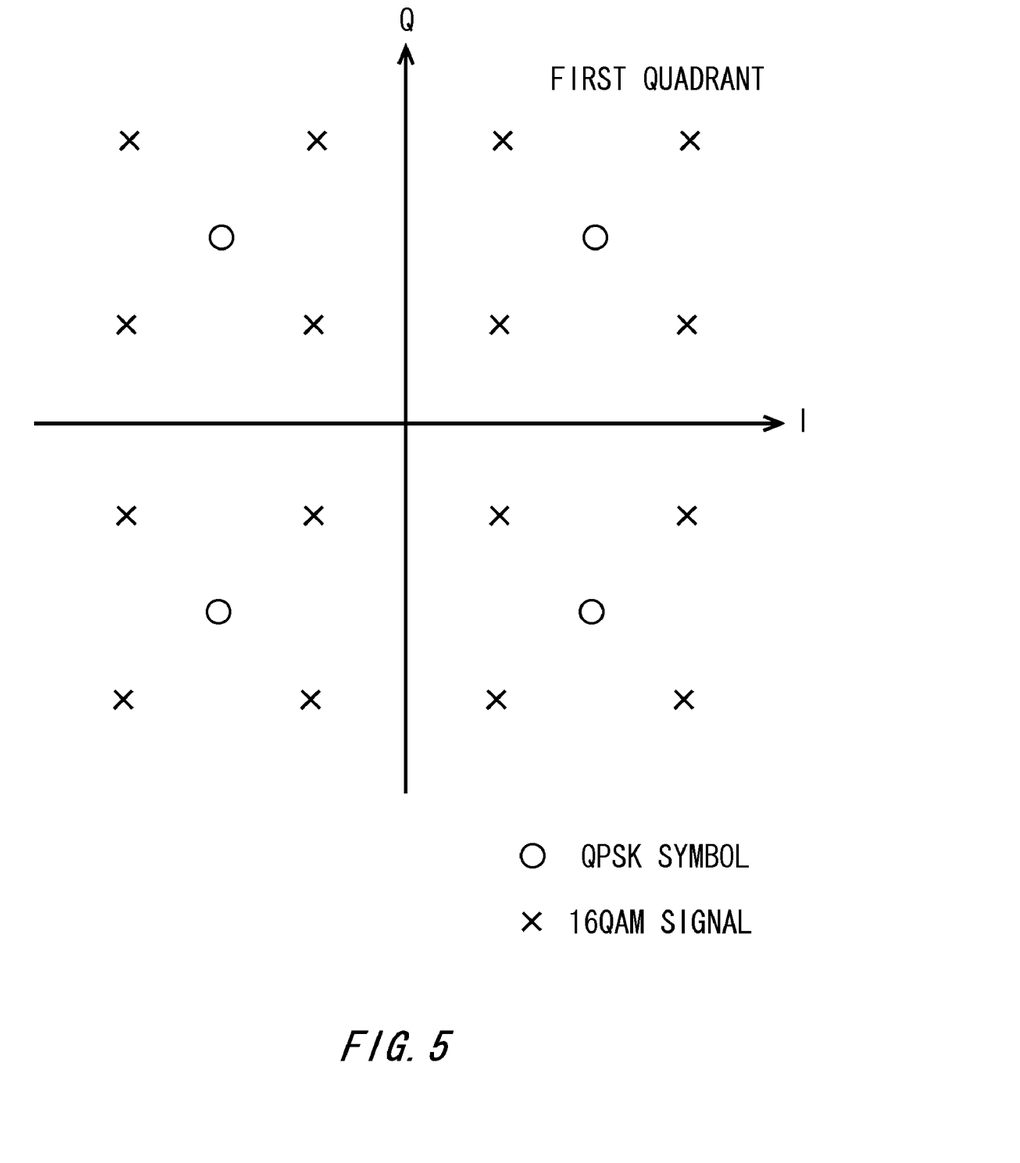
FIG. 5 shows a Cartesian coordinate system in which are plotted signal points of a data signal that is QPSK modulated and a data signal that is 16 QAM modulated.

FIG. 5 shows a Cartesian coordinate system in which are plotted signal points of a data signal that is QPSK modulated and a data signal that is 16 QAM modulated. The output control section 12 can cause a data signal that is orthogonally phase modulated to be included in the OFDM modulated signal and can cause a data signal that is orthogonally amplitude modulated to be included in the OFDM modulated signal.

The power of an OFDM modulated signal that includes an orthogonally phase modulated data signal is ideally constant. The power of an OFDM modulated signal that includes an orthogonally amplitude modulated data signal changes depending on the included sign.

Here, based on the first quadrant of the Cartesian plane in FIG. 5, it is understood that the average value of the power of the four 16 QAM signal points in the first quadrant matches the power of the one QPSK signal point in the first quadrant. Accordingly, when the OFDM modulated signal includes a 16 QAM modulated data signal, the output control section 12 can express the plurality of signal points acquired from the 16 QAM modulation as an average to match the power of the OFDM modulated signal that includes the QPSK modulated data signal.

Therefore, when the transmission apparatus under test 100 outputs an OFDM modulated signal obtained by orthogonally amplitude modulating the data signal, the output control section 12 causes the power over the repetition period of the OFDM modulated signal being output to be substantially equal to the power over the repetition period of the OFDM modulated signal obtained by orthogonally phase modulating the data signal. The comparing section 18 compares (i) the power measured by the power measuring section 16 to (ii) the expected power that is the same when the data signal is orthogonally phase modulated and when the data signal is orthogonally amplitude modulated. In this way, the comparing section 18 can use the same expected power regardless of the type of modulation. Therefore, the comparing section 18 can easily compare the measured power to the expected power.

Furthermore, the output control section 12 may cause the transmission apparatus under test 100 to output an OFDM modulated signal in which the difference in occurrence rates of the signs of the data signal in the repetition period is within a prescribed range. For example, the output control section 12 may cause the transmission apparatus under test 100 to output an OFDM modulated signal in which the difference between the minimum value and the maximum value of the occurrence rate of each type of signal in each repetition period, e.g. the occurrence rates of 00, 01, 10, and 11 for QPSK, is within a predetermined range. Therefore, the output control section 12 can prevent the transmission apparatus under test 100 from outputting an OFDM modulated signal in which the amplitude and the phase are skewed for prescribed symbols. In other words, the test apparatus 10 can measure averaged characteristics of the transmission apparatus under test 100.

Figure 6:
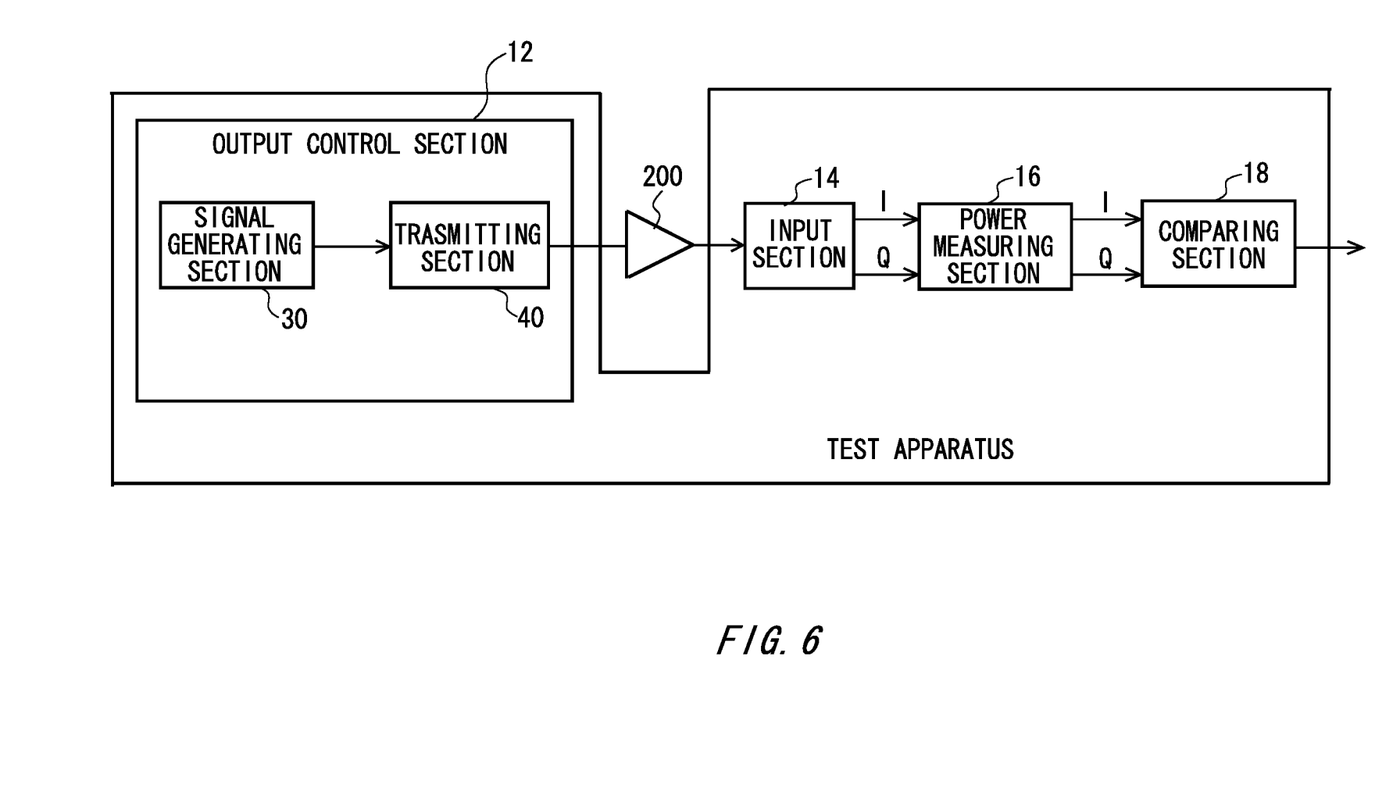
FIG. 6 shows a configuration of the test apparatus 10 according to an embodiment of the present invention, along with a carrier modulation apparatus under test 200.

FIG. 6 shows a configuration of the test apparatus 10 according to an embodiment of the present invention, along with a carrier modulation apparatus under test 200. The test apparatus 10 of the present embodiment has substantially the same function and configuration as the test apparatus 10 described in FIG. 1 and components that are the same as those shown in FIG. 1 are given the same reference numerals. Therefore, the following description includes only differing points.

The test apparatus 10 of the present embodiment tests the carrier modulation apparatus under test 200, which is an example of a transmitting device according to the present invention. The carrier modulation apparatus under test 200 may be an orthogonal modulator provided at an output stage of a transmission apparatus.

In the present embodiment, the output control section 12 further includes a transmitting section 40. The signal generating section 30 supplies the transmitting section 40 with transmission data. The transmitting section 40 performs an IFFT on the transmission data to generate an OFDM modulated signal of a baseband signal or an IF signal, and supplies the resulting signal to the carrier modulation apparatus under test 200. The transmitting section 40 causes the carrier modulation apparatus under test 200 to output a transmission signal obtained by modulating the OFDM modulated signal of the baseband signal or the IF signal with a carrier signal. The test apparatus 10 of the present embodiment can test the characteristics of an orthogonal modulator provided at an output stage of a transmission apparatus.

Figure 7:
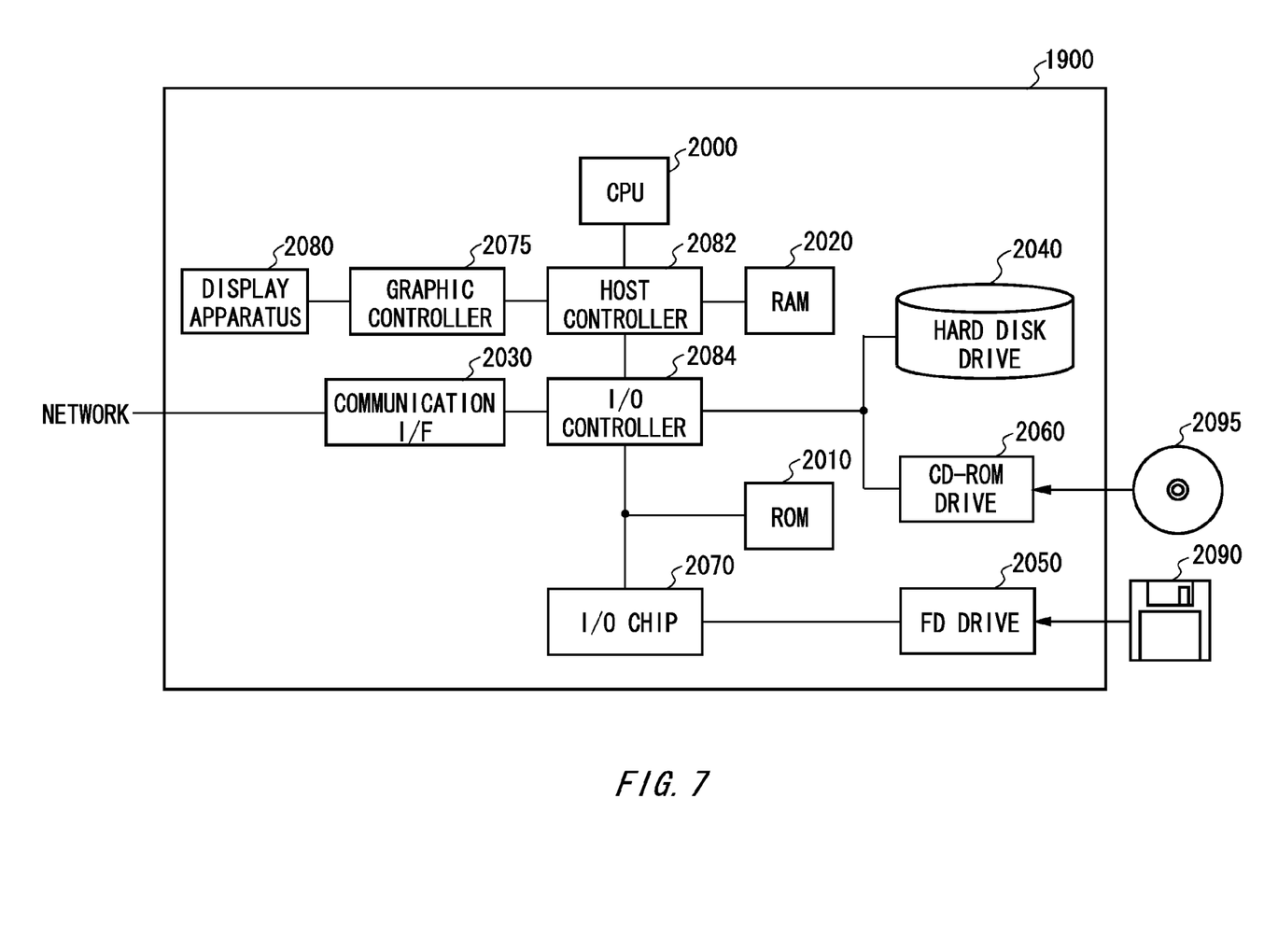
FIG. 7 shows an example of a hardware configuration of a computer 1900 according to the present embodiment.

FIG. 7 shows an example of a hardware configuration of a computer 1900 according to the present embodiment. The computer 1900 according to the present embodiment is provided with a CPU peripheral including a CPU 2000, a RAM 2020, a graphic controller 2075, and a displaying apparatus 2080, all of which are connected to each other by a host controller 2082; an input/output section including a communication interface 2030, a hard disk drive 2040, and a CD-ROM drive 2060, all of which are connected to the host controller 2082 by an input/output controller 2084; and a legacy input/output section including a ROM 2010, a flexible disk drive 2050, and an input/output chip 2070, all of which are connected to the input/output controller 2084.

The host controller 2082 is connected to the RAM 2020 and is also connected to the CPU 2000 and graphic controller 2075 accessing the RAM 2020 at a high transfer rate. The CPU 2000 operates to control each section based on programs stored in the ROM 2010 and the RAM 2020. The graphic controller 2075 acquires image data generated by the CPU 2000 or the like on a frame buffer disposed inside the RAM 2020 and displays the image data in the displaying apparatus 2080. Instead, the graphic controller 2075 may internally include the frame buffer storing the image data generated by the CPU 2000 or the like.

The input/output controller 2084 connects the communication interface 2030 serving as a relatively high speed input/output apparatus, the hard disk drive 2040, and the CD-ROM drive 2060 to the host controller 2082. The communication interface 2030 communicates with other apparatuses via a network. The hard disk drive 2040 stores the programs and data used by the CPU 2000 housed in the computer 1900. The CD-ROM drive 2060 reads the programs and data from a CD-ROM 2095 and provides the read information to the hard disk drive 2040 via the RAM 2020.

Furthermore, the input/output controller 2084 is connected to the ROM 2010, and is also connected to the flexible disk drive 2050 and the input/output chip 2070 serving as a relatively high speed input/output apparatus. The ROM 2010 stores a boot program performed when the computer 1900 starts up, a program relying on the hardware of the computer 1900, and the like. The flexible disk drive 2050 reads programs or data from a flexible disk 2090 and supplies the read information to the hard disk drive 2040 via the RAM 2020. The input/output chip 2070 connects the flexible disk drive 2050 to each of the input/output apparatuses via, for example, a parallel port, a serial port, a keyboard port, a mouse port, or the like.

The programs provided to the hard disk drive 2040 via the RAM 2020 are stored in a storage medium, such as the flexible disk 2090, the CD-ROM 2095, or an IC card, and provided by a user. The programs are read from storage medium, installed in the hard disk drive 2040 inside the computer 1900 via the RAM 2020, and performed by the CPU 2000.

The programs installed in the computer 1900 to make the computer 1900 function as the test apparatus 10 are provided with an output control module, an input control module, a power measuring module, and a comparing module. These programs and modules prompt the CPU 2000 or the like to make the computer 1900 function as the output control section 12, the input section 14, the power measuring section 16, and the comparing section 18, respectively.

The programs and modules shown above may also be stored in an external storage medium. The flexible disk 2090, the CD-ROM 2095, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A measurement apparatus that measures power of an orthogonal frequency division multiplexing modulated signal (OFDM modulated signal) output from a transmitting device, comprising:
an output control section that causes the transmitting device to output the OFDM modulated signal having a prescribed waveform that repeats in each of a plurality of repetition periods; and
a power measuring section that measures, over a measurement period that corresponds to an integer multiple of the repetition period, the power of the OFDM modulated signal output by the transmitting device, wherein
the output control section causes the transmitting device to output the OFDM modulated signal having, as the repetition period, a period for which the arrangement of a pilot signal is the same in a direction of sub-carriers and a direction of OFDM symbols, and
when the output control section causes an OFDM modulated signal obtained by orthogonally amplitude modulating a data signal, which is a signal component other than a pilot signal, to be output from the transmitting device, the output control section causes the power, over the repetition period, of the OFDM modulated signal to be transmitted to be substantially equal to the power, over the repetition period, of an OFDM modulated signal obtained by orthogonally phase modulating the data signal.

2. The measurement apparatus according to claim 1, further comprising
a comparing section that compares (i) the power measured by the power measuring section to (ii) expected power that is the same when the data signal is orthogonally phase modulated and when the data signal is orthogonally amplitude modulated.

3. The measurement apparatus according to claim 1, wherein
the output control section causes the transmitting device to output the OFDM modulated signal without including a guard interval.

4. The measurement apparatus according to claim 1, wherein
the output control section causes the transmitting device to output the OFDM modulated signal in which a difference in occurrence rates between signs of a data signal in the repetition period is within a prescribed range.

5. The measurement apparatus according to claim 1, wherein
the transmitting device is a carrier modulation apparatus,
the output control section comprises a transmitting section that performs an Inverse Fast Fourier Transform (IFFT) on supplied transmission data to generate an OFDM modulated signal of a baseband signal or an IF signal, and supplies the resulting signal to the transmitting device, and
the transmitting section causes the transmitting device to output a transmission signal obtained by modulating the OFDM modulated signal with a carrier signal.

6. A measurement apparatus that measures power of an orthogonal frequency division multiplexing modulated signal (OFDM modulated signal) output from a transmitting device, comprising:
an output control section that causes the transmitting device to output the OFDM modulated signal having a prescribed waveform that repeats in each of a plurality of repetition periods;
a power measuring section that measures, over a measurement period that corresponds to an integer multiple of the repetition period, the power of the OFDM modulated signal output by the transmitting device; and
an input section that samples the OFDM modulated signal output from the transmitting device and receives a measurement period portion of the sampled OFDM modulated signal, the measurement period corresponding to a period of the prescribed waveform, wherein
the input section samples the OFDM modulated signal using a sampling frequency obtained as a product of (i) a value obtained by dividing a sampling frequency of OFDM symbols of the OFDM modulated signal by a number of FFT points and (ii) an arbitrary number that determines the number of samples of the sampled OFDM modulated signal.

7. The measurement apparatus according to claim 6, wherein
the output control section causes the transmitting device to output the OFDM modulated signal having, as the repetition period, a period for which the arrangement of a pilot signal is the same in a direction of sub-carriers and a direction of OFDM symbols.

8. The measurement apparatus according to claim 6, wherein
the input section samples the OFDM modulated signal using a sampling frequency that is synchronized with a sampling frequency of the OFDM modulated signal output from the transmitting device.

9. The measurement apparatus according to claim 6, wherein
the output control section causes the transmitting device to output the OFDM modulated signal without including a guard interval.

10. The measurement apparatus according to claim 6, wherein
the output control section causes the transmitting device to output the OFDM modulated signal in which a difference in occurrence rates between signs of a data signal in the repetition period is within a prescribed range.

11. The measurement apparatus according to claim 6, wherein
the transmitting device is a carrier modulation apparatus,
the output control section comprises a transmitting section that performs an Inverse Fast Fourier Transform (IFFT) on supplied transmission data to generate an OFDM modulated signal of a baseband signal or an IF signal, and supplies the resulting signal to the transmitting device, and
the transmitting section causes the transmitting device to output a transmission signal obtained by modulating the OFDM modulated signal with a carrier signal.

12. A non-transitory computer readable medium, storing thereon a program that causes an information processing apparatus to function as a measurement apparatus that measures power of an orthogonal frequency division multiplexing modulated signal (OFDM modulated signal) output from a transmitting device, the program causing the information processing apparatus to function as a measurement apparatus comprising:
    an output control section that causes the transmitting device to output the OFDM modulated signal having a prescribed waveform that repeats in each of a plurality of repetition periods; and
    a power measuring section that measures, over a measurement period that corresponds to an integer multiple of the repetition period, the power of the OFDM modulated signal output by the transmitting device, wherein
    the output control section causes the transmitting device to output the OFDM modulated signal having, as the repetition period, a period for which the arrangement of a pilot signal is the same in a direction of sub-carriers and a direction of OFDM symbols, and
    when the output control section causes an OFDM modulated signal obtained by orthogonally amplitude modulating a data signal, which is a signal component other than a pilot signal, to be output from the transmitting device, the output control section causes the power, over the repetition period, of the OFDM modulated signal to be transmitted to be substantially equal to the power, over the repetition period, of an OFDM modulated signal obtained by orthogonally phase modulating the data signal.

13. The non-transitory computer readable medium according to claim 12, wherein the program causes the information processing apparatus to function as a measurement apparatus further comprising
    a comparing section that compares (i) the power measured by the power measuring section to (ii) expected power that is the same when the data signal is orthogonally phase modulated and when the data signal is orthogonally amplitude modulated.

14. The non-transitory computer readable medium according to claim 12, wherein
    the output control section causes the transmitting device to output the OFDM modulated signal without including a guard interval.

15. The non-transitory computer readable medium according to claim 12, wherein
    the output control section causes the transmitting device to output the OFDM modulated signal in which a difference in occurrence rates between signs of a data signal in the repetition period is within a prescribed range.

16. The non-transitory computer readable medium according to claim 12, wherein
    the transmitting device is a carrier modulation apparatus,
    the output control section comprises a transmitting section that performs an Inverse Fast Fourier Transform (IFFT) on supplied transmission data to generate an OFDM modulated signal of a baseband signal or an IF signal, and supplies the resulting signal to the transmitting device, and
    the transmitting section causes the transmitting device to output a transmission signal obtained by modulating the OFDM modulated signal with a carrier signal.

17. The non-transitory computer readable medium according to claim 12, wherein
    the output control section causes the transmitting device to output the OFDM modulated signal having, as the repetition period, a period for which the arrangement of a pilot signal is the same in a direction of sub-carriers and a direction of OFDM symbols.

18. The non-transitory computer readable medium according to claim 12, wherein
    the input section samples the OFDM modulated signal using a sampling frequency that is synchronized with a sampling frequency of the OFDM modulated signal output from the transmitting device.

19. The non-transitory computer readable medium according to claim 12, wherein
    the output control section causes the transmitting device to output the OFDM modulated signal without including a guard interval.

20. The non-transitory computer readable medium according to claim 12, wherein
    the output control section causes the transmitting device to output the OFDM modulated signal in which a difference in occurrence rates between signs of a data signal in the repetition period is within a prescribed range.

21. The non-transitory computer readable medium according to claim 12, wherein
    the transmitting device is a carrier modulation apparatus,
    the output control section comprises a transmitting section that performs an Inverse Fast Fourier Transform (IFFT) on supplied transmission data to generate an OFDM modulated signal of a baseband signal or an IF signal, and supplies the resulting signal to the transmitting device, and
    the transmitting section causes the transmitting device to output a transmission signal obtained by modulating the OFDM modulated signal with a carrier signal.

22. A non-transitory computer readable medium, storing thereon a program that causes an information processing apparatus to function as a measurement apparatus that measures power of an orthogonal frequency division multiplexing modulated signal (OFDM modulated signal) output from a transmitting device, the program causing the information processing apparatus to function as a measurement apparatus comprising:
    an output control section that causes the transmitting device to output the OFDM modulated signal having a prescribed waveform that repeats in each of a plurality of repetition periods;
    a power measuring section that measures, over a measurement period that corresponds to an integer multiple of the repetition period, the power of the OFDM modulated signal output by the transmitting device; and
    an input section that samples the OFDM modulated signal output from the transmitting device and receives a measurement period portion of the sampled OFDM modulated signal, the measurement period corresponding to a period of the prescribed waveform, wherein
    the input section samples the OFDM modulated signal using a sampling frequency obtained as a product of (i) a value obtained by dividing a sampling frequency of OFDM symbols of the OFDM modulated signal by a number of FFT points and (ii) an arbitrary number that determines the number of samples of the sampled OFDM modulated signal.

\* \* \* \* \*